United States Patent [19]

Lee et al.

[11] Patent Number: 4,817,030
[45] Date of Patent: Mar. 28, 1989

[54] CMOS FULL-ADDER STAGE

[75] Inventors: Peter Lee, Freiburg; Ulrich Theus, Gundelfingen, both of Fed. Rep. of Germany

[73] Assignee: Deutsche ITT Industries GmbH, Freiburg, Fed. Rep. of Germany

[21] Appl. No.: 28,251

[22] Filed: Mar. 20, 1987

[30] Foreign Application Priority Data

Mar. 22, 1986 [EP] European Pat. Off. ........ 86103947.7

[51] Int. Cl.$^4$ ................................................ G06F 7/50
[52] U.S. Cl. ..................................... 364/784; 364/786
[58] Field of Search ........................ 364/784, 785, 786

[56] References Cited

U.S. PATENT DOCUMENTS 4,621,338 11/1986 Uhlenhoff .......................... 364/784
4,651,296 3/1987 Koike .................................. 364/784
4,701,877 10/1987 Sahoda et al. ...................... 364/784
4,713,790 12/1987 Kloker et al. ...................... 364/784

FOREIGN PATENT DOCUMENTS 0122946 10/1984 European Pat. Off. ............... 19/21
0143456 5/1985 European Pat. Off. ................ 7/50

Primary Examiner—David H. Malzahn
Attorney, Agent, or Firm—Thomas L. Peterson

[57] ABSTRACT

To a prior art CMOS full-adder stage having sixteen transistors, a static inverter is added which consists of a P-type transistor and an N-type transistor, and the series combination (sc) of P- and N-type transistors is wired symmetrically. This increases the processing frequency, because the carry-signal path is no longer loaded by the four transistors contributing to the summation.

9 Claims, 2 Drawing Sheets

CMOS FULL-ADDER STAGE

BACKGROUND OF THE INVENTION

The present invention is an improvement to a CMOS full-adder stage having the features of the preamble of claim 1. In particular, the present invention is an improvement to a CMOS full-adder stage such as is disclosed in the published European Patent Application EP-A-No. 112 946, particularly FIG. 5.

During the use of the prior art full-adder stage and the variant according to FIG. 6 of EP-A-No. 112 946 in monolithic integrated parallel adders, it turned out that the maximum possible processing speed is limited by the fact that in each stage, the carry input signal is also applied to transistors which contribute to the summation, so that the carry-signal path is also capacitively loaded.

SUMMARY OF THE INVENTION

The object of the invention as claimed is to modify the prior art CMOS full-adder stage in such a way that the aforementioned capacitive loading of the carry-signal path is substantially reduced, so that the arrangement will also operate at higher frequencies than the prior art arrangement. Although the CMOS full-adder stage according to the invention has four transistors more than the prior art arrangement, namely 20 instead of 16 transistors, the resulting slight increase in the chip area required by the CMOS full-adder stage is accepted.

BRIEF DESCRIPTION OF THE DRAWING

The invention will now be explained in more detail with reference to the accompanying drawings, in which.

DETAILED DESCRIPTION OF THE DRAWING

Figure 1:
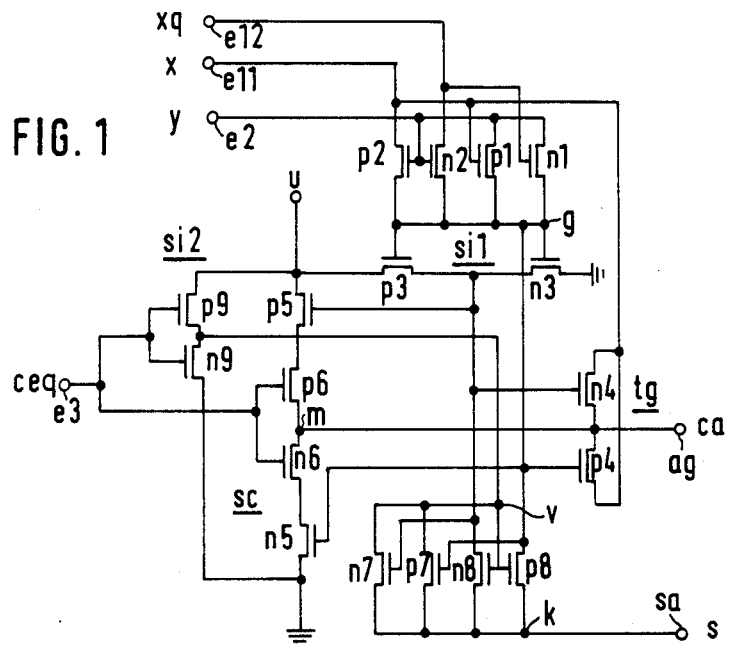
FIG. 1 is a circuit diagram of a full-adder stage in accordance with the invention.

In the circuit diagram of FIG. 1, the 16 transistors p1, n1 . . . p8, n8 are those which are also present in the prior art arrangement. In the prior art arrangement, the interconnection of these 16 transistors is slightly different from that in the present invention; in particular, the series combination sc of the transistors p5, n5, p6, n6 is different as far as the formation of its input is concerned. While in the prior art arrangement the input is formed by the interconnection of the gates of the transistors n5, p5, this is done in the present invention by interconnecting the gates of the transistors p6, n6. In the present invention, therefore, the gates of the two other transistors p5, n5 are connected to the gates of the transmission-gate transistors n4, p4, too.

Also, the signal applied to the input of the transmission gate tg is different from that in the prior art arrangement.

Referring to FIG. 1 in detail, the gate of the first P-type transistor p1 is connected to the first subinput e11 for the uninverted first signal to be added, x. The gate of the first N-type transistor n1 is connected to the second subinput e12 for the inverted first signal to be added, xq.

One terminal of the source-drain path of the second N-type transistor n2 is connected to the second subinput e12. One terminal of the source-drain path of the second P-type transistor p2 is connected to the first subinput e11.

The gates of the transistors p2, n2 and one terminal of the source-drain path of each of the transistors p1, n1 are connected in common to the second input e2, while the other terminals of these four transistors p1, n1, p2, n2 are connected to the common junction point g.

The first static inverter si1, formed by the series combination of the source-drain paths of the third P-type transistor p3 and the third N-type transistor n3, has its input connected to the common junction point g, the series combination being interposed between the supply-voltage source u and ground. The input of the transmission gate tg, formed in the usual manner by connecting the source-drain paths of the fourth N-type transistor n4 and the fourth P-type transistor p4 in parallel, is connected to the first subinput e11, while the output of this transmission gate is the output ag for the uninverted carry output signal ca. The gate of the fourth P-type transistor p4 is connected to the common junction point g and, thus, to the input of the first static inverter si1, and the gate of the fourth N-type transistor n4 is connected to the output of this inverter.

As mentioned earlier, the series combination sc consists of the source-drain paths of the fifth P-type transistor p5, the sixth P-type transistor p6, the sixth N-type transistor n6, and the fifth N-type transistor n5, which are connected in series in this order between the supply-voltage source u and ground. The interconnected gates of the transistors n6, p6 form the input of this inverter and are connected to the third input e3, while the center point m of this series combination is connected to the output of the transmission gate tg and, thus, to the output ag. The gate of the fifth N-type transistor n5 is connected to the common junction point g and, thus, to the gate of the fourth P-type transistor p4. The gate of the fifth P-type transistor p5 is connected to the output of the first static inverter si1 and, thus, to the gate of the fourth N-tuype transistor n4. In the present invention, the internal transistors p6, n6 are the input transistors, while in the prior art arrangement, it is exactly the opposite.

The gate of the seventh P-type transistor p7, together with one terminal of the source-drain path of the eighth P-type transistor p8, is connected to the common junction point g. The gate of the seventh N-type transistor n7, together with one terminal of the source-drain path of the eighth N-type transistor n8, is connected to the output of the first static inverter si1. The gate of the eighth N-type transistor n8 and the gate of the eighth P-type transistor p8, together with one terminal of the respective source-drain path of the seventh N-type transistor n7 and the seventh P-type transistor p7, are connected to the node v. The four other terminals of the source-drain paths of the transistors p7, n7, p8, n8 form the common node k, which is the sum output sa for the signal s of the full-adder stage.

The second static inverter si2 consists of the series combination of the source-drain paths of the ninth P-type transistor p9 and the ninth N-type transistor n9. This series combination is interposed between the supply-voltage source u and the ground, with the gates of the two transistors p9, n9 connected to the third input e3, and the junction point of the source-drain paths of these two transistors connected as the output of this inverter to the node v (in the prior art arrangement, the latter is connected to the third input e3, which fact, among other things, entails the disadvantage described above).

Figure 2:
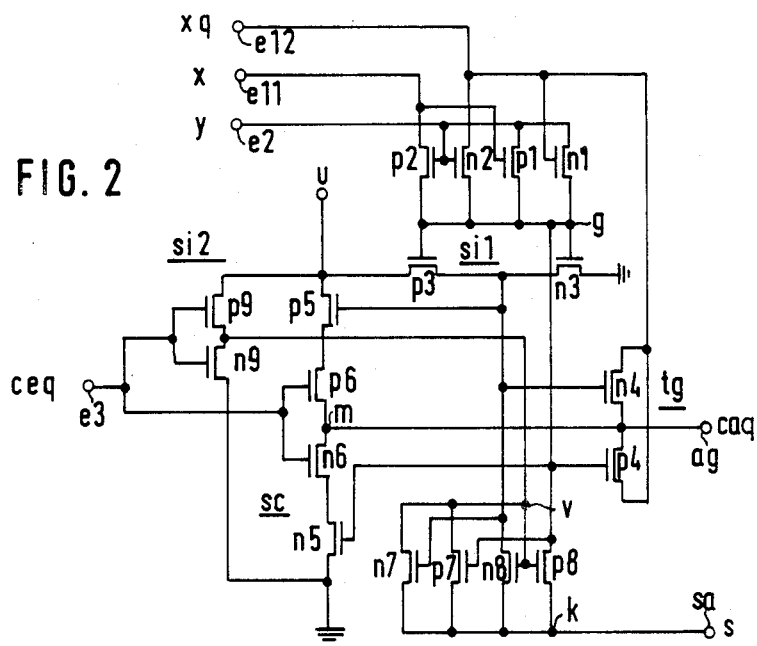
FIG. 2 is a circuit diagram of a variant of the arrangement of FIG. 1 for an inverted carry input signal and an uninverted carry output signal.

FIG. 2 shows a circuit diagram of a variant of the arrangement of FIG. 1 for an inverted carry signal ceq to be applied to the third input e3 and an inverted carry signal caq to be provided at the carry output ag. Such a stage is required if a CMOS parallel adder is to be constructed with the arrangements of FIGS. 1 and 2.

The arrangement of FIG. 2 differs from that of FIG. 1 in that the input of the transmission gate tg is connected to the second subinput e12 (in the prior art arrangement, this input is connected to the second input).

Figure 3:
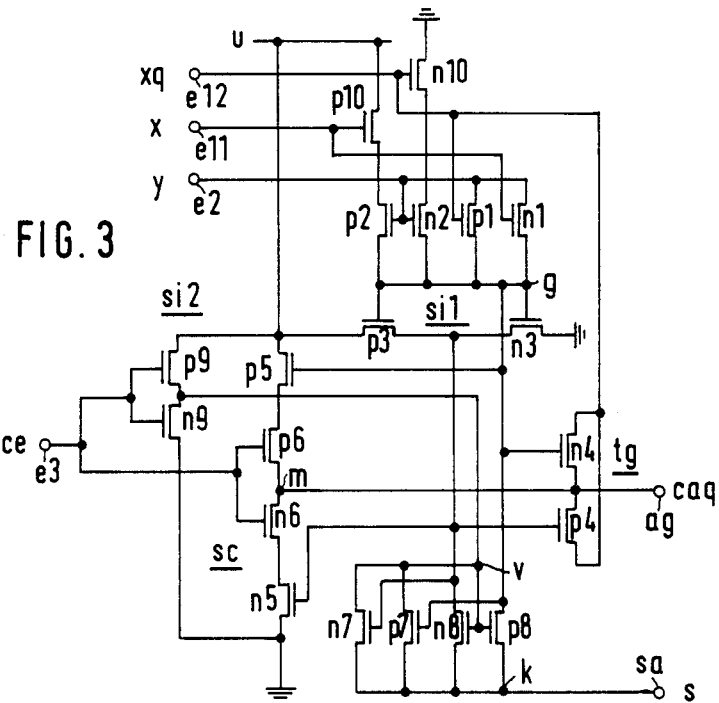
FIG. 3 is a circuit diagram of a development of the arrangement of FIG. 1.

In the development of FIG. 3, the two transistors p10, n10 are provided, through which the uninverted first signal to be added, x, and the inverted first signal to be added, xq, are applied to the transistors n2, p2.

One terminal of source-drain path of the second N-type transistor n2 is grounded through the source-drain path of the tenth N-type transistor n10, which has its gate connected to the second subinput e12. One terminal of the source-drain path of the second P-type transistor p2 is connected to the supply-voltage source u through the source-drain path of the tenth P-type transistor p10, whose gate is connected to the first subinput e11.

The input of the transmission gate tg in FIG. 3 is connected to the second subinput e12. The gate of the fourth N-type transistor n4 is connected to the common junction point g and, thus, to the input of the first static inverter si1, and the gate of the fourth P-type transistor p4 to the output of this inverter.

The gate of the fifth P-type transistor p5 is connected to the common junction point g and, thus, to the gate of the fourth N-type transistor n4. The gate of the fifth N-type transistor n5 is connected to the output of the first static inverter si1 and, thus, to the gate of the fourth P-type transistor p4.

Figure 4:
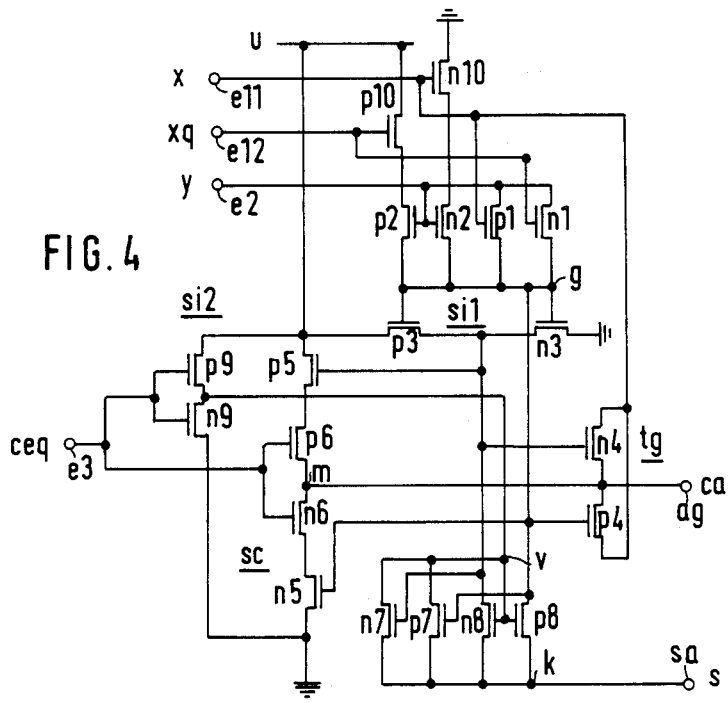
FIG. 4 is a circuit diagram of a development of the variant of FIG. 2.

The circuit diagram of FIG. 4 shows a development of the variant of FIG. 2.

The gate of the tenth N-type transistor n10 is connected to the first subinput e11, and the gate of the tenth P-type transistor p10 is connected to the second subinput e12. The input of the transmission gate tg is connected to the first subinput e11. The gate of the fourth P-type transistor p4, together with the gate of the fifth N-type transistor n5, is connected to the common junction point and, thus, to the input of the first static inverter si1, and the gate of the fourth N-type transistor n4, together with the gate of the fifth P-type transistor p5, is connected to the output of this inverter.

By a computer simulation of CMOS full-adder stages as shown in FIGS. 3 and 4, it was determined that a 16-stage parallel adder without pipelining has an upper cut-off frequency of about 30 MHz.

What is claimed is:

1. A CMOS full-adder stage comprising:
   a first subinput for the uninverted first signal to be added;
   an associated second subinput for the inverted first signal to be added;
   a second input for an uninverted second signal to be added;
   a third input for a carry input signal;
   a first P-type transistor having its gate connected to one of the first subinput and the second subinput, and one terminal of its source-drain path connected to the second input;
   a first N-type transistor having its gate connected to the other of the first subinput and the second subinput, and one terminal of its source-drain path connected to the second input;
   a second N-type transistor having its gate connected to the second input, and having one terminal of its source-drain path coupled to receive a signal responsive to one of the uninverted first signal to be added and the inverted first signal to be added;
   a second P-type transistor having its gate connected to the second input, and having one terminal of its source-drain path coupled to receive a signal responsive to the other of the uninverted first signal to be added and the inverted first signal to be added;
   a common junction point of the other terminals of the source-drain paths of the first and second P- and N-type transistors;
   a first static inverter formed by the series combination of the source-drain paths of a third P-type transistor and a third N-type transistor, said series combination formed by the common connection of one terminal of the source-drain path of the third P-type transistor with one terminal of the source-drain path of the third N-type transistor, said common connection comprising the output of said first static inverter, said third P-type transistor and said N-type transistor having their gates connected to the common junction point, said gates being the input of said first static inverter, said series combination being interposed between a supply voltage source and ground;
   a transmission gate consisting of a fourth N-type transistor and a fourth P-type transistor, one of said fourth N-type transistor and said fourth P-type transistor having its gate connected to the output of the first static inverter and the other of said fourth N-type transistor and said fourth P-type transistor having its gate connected to the input of the first static inverter, the output of the transmission gate being the output for the carry signal, and the input of the transmission gate being presented with one of the uninverted first signal to be added and the inverted first signal to be added;
   a series combination of the source-drain paths of a fifth P-type transistor, a sixth P-type transistor, a sixth N-type transistor, and a fifth N-type transistor, said source-drain paths being arranged in this order between the supply-voltage source and ground, said fifth P-type transistor and said fifth N-type transistor comprising a first pair of transistors symmetrical with respect to a center point of said series combination, said sixth P-type transistor and said sixth N-type transistor comprising a second pair of transistors symmetrical with respect to said center point of said series combination, with
   the center point of the series combination connected to the output of the transmission gate,
   the gates of the two transistors in one of said first and second pairs of transistors are symmetrical with respect to the center point being connected together and connected to the third input, and
   the gates of one of the two transistors of the other of said first and second pairs of transistors connected to the common junction point, and the gate of the other of the two transistors of the other of said first and second pairs of transistors connected to the output of the first static inverter;

a seventh P-type transistor having its gate connected to the common junction point;

a seventh N-type transistor having its gate connected to the output of the first static inverter;

an eighth N-type transistor having one terminal of its source-drain path connected to the output of the first static inverter;

an eighth P-type transistor having one terminal of its source-drain path connected to the common junction point;

a node having one terminal of the source-drain path of the seventh P-type transistor, one terminal of the source-drain path of the seventh N-type transistor, and the gates of the eighth P- and N-type transistors connected thereto; and a common node of the other terminals of the source-drain paths of the seventh and eighth P- and N-type transistors, which is the output for the uninverted sum signal; wherein:

said CMOS full-adder stage further comprises:

a second static inverter formed by the series combination of the source-drain paths of a ninth P-type transistor and a ninth N-type transistor interposed between the supply-voltage source and ground, the input of the second static inverter being connected to the third input, and the output of the second static inverter being connected to the node;

and wherein:

the input of the transmission gate is connected to one of the first subinput and the second subinput;

the gate of one of the fifth N-type transistor and the fifth P-type transistor is connected to the common junction point;

the gate of the other of the fifth N-type transistor and the fifth P-type transistor is connected to the output of the first static inverter; and the gates of the sixth P- and N-type transistors, are connected to the third input.

2. A CMOS full-adder stage as claimed in claim 1, wherein said input of the transmission gate is connected to the second subinput thereby presenting said transmission gate with the inverted signal to be added.

3. A CMOS full-adder stage as claimed in claim 1, wherein:

said second P-type transistor is coupled to receive a signal responsive to said uninverted first signal to be added by including a tenth P-type transistor having its source-drain path interposed between the supply-voltage and one terminal of the source-drain path of the second P-type transistor, the gate of the tenth P-type transistor being connected to the first subinput;

said second N-type transistor is coupled to receive a signal responsive to the inverted first signal to be added by including a tenth N-type transistor having its source-drain path connected between ground and one terminal of the source-drain path of the second N-type transistor, the gate of the tenth N-type transistor being connected to the second subinput;

the gate of the first N-type transistor is connected to the first subinput;

the gate of the first P-type transistor is connected to the second subinput;

the gate of the fourth N-type transistor and that of the fifth P-type transistor are connected to the common junction point; and the gate of the fourth P-type transistor and that of the fifth N-type transistor are connected to the output of the first static inverter.

4. A CMOS full-adder stage as claimed in claim 1, wherein:

said second P-type transistor is coupled to receive a signal responsive to said inverted first signal to be added by including a tenth P-type transistor connected between the supply-voltage source and one terminal of the source-drain path of the second P-type transistor, the gate of the tenth P-type transistor being connected to the second subinput;

said second N-type transistor is coupled to receive a signal responsive to said uninverted first signal to be added by including a tenth N-type transistor connected between ground and one terminal of the source-drain path of the second N-type transistor, the gate of the tenth N-type transistor being connected to the first subinput;

the gate of the first N-type transistor is connected to the second subinput;

the gate of the first P-type transistor is connected to the first subinput;

the input of the transmission gate is connected to the first subinput;

the gate of the fourth N-type transistor and that of the fifth P-type transistor are connected to the output of the first static inverter; and the gate of the fourth P-type transistor and that of the fifth N-type transistor are connected to the common junction point.

5. A CMOS full-adder stage as claimed in claim 1, wherein said input of the transmission gate is connected to the first subinput thereby presenting said transmission gate with the uninverted signal to be added.

6. A CMOS full-adder stage that receives a first signal to be added, a second signal to be added and a carry input signal, said full-adder stage providing a sum output signal and a carry output signal, said first signal to be added being provided as an uninverted first input signal to be added and an inverted first input signal to be added, said CMOS full-adder stage comprising:

a first subinput that receives the uninverted first input signal to be added;

an associated second subinput that receives the inverted first input signal to be added;

a second input that receives the second signal to be added;

a third input that receives the carry input signal; a first P-type transistor having its gate connected to the first subinput, and one terminal of its source-drain path to the second input;

a first N-type transistor having its gate connected to the second subinput, and one terminal of its source-drain path to the second input;

a second N-type transistor having its gate connected to the second input, and one terminal of its source-drain path to the second subinput;

a second P-type transistor having its gate connected to the second input, and one terminal of its source-drain path to the first subinput;

a common junction point of the other terminals of the source-drain paths of the first and second P- and N-type transistors;

a first static inverter formed by the series combination of the source-drain paths of a third P-type transistor and a third N-type transistor, said series combination formed by the common connection of one terminal of the source-drain path of the third P-type transistor with one terminal of the source-drain path of the third N-type transistor, said common connection comprising the output of said first static inverter, said third P-type transistor and said N-type transistor having their gates connected to the common junction point, said gates being the input of said first static inverter, said series combination being interposed between a supply voltage source and ground;

a transmission gate consisting of a fourth N-type transistor and a fourth P-type transistor having their gates connected, respectively, to the output and the input of the first static inverter, the output of the transmission gate being the carry output signal, and the input of the transmission gate being presented with the uninverted first signal to be added;

a series combination of the source-drain paths of a fifth P-type transistor, a sixth P-type transistor, a sixth N-type transistor, and a fifth N-type transistor, said source-drain paths being arranged in this order between the supply-voltage source and ground, said fifth P-type transistor and said fifth N-type transistor comprising a first pair of transistors symmetrical with respect to a center point of said series combination, said sixth P-type transistor and said sixth N-type transistor comprising a second pair of transistors symmetrical with respect to said center point of said series combination, wherein:

the center point of the series combination connected to the output of the transmission gate;

the gates of the two transistors in one of said first and second pairs of transistors being connected together and connected to the third input; and the gate of one of the two transistors of the other of said first and second pairs of transistors connected to the common junction point, and the gate of the other of the two transistors of the other of said first and second pairs of transistors connected to the output of the static inverter;

a seventh P-type transistor having its gate connected to the common junction point;

a seventh N-type transistor having its gate connected to the output of the first static inverter;

an eighth N-type transistor having one terminal of its source-drain path connected to the output of the first static inverter;

an eighth P-type transistor having one terminal of its source-drain path connected to the common junction point;

a node having one terminal of the source-drain path of the seventh P-type transistor, one terminal of the source-drain path of the seventh N-type transistor, and the gates of the eighth P- and N- type transistors connected thereto; and a common node of the other terminals of the source-drain paths of the seventh and eighth P- and N-type transistors, which is the output for the sum signal; wherein:

said CMOS full-adder stage further comprises:

a second static inverter formed by the series combination of the source-drain paths of a ninth P-type transistor and a ninth N-type transistor interposed between the supply-voltage source and ground, the input of the second static inverter being connected to the third input, and the output of the second static inverter being connected to the node;

and wherein:

the input of the transmission gate is connected to the first subinput;

the gate of the fifth N-type transistor is connected to the common junction point;

the gate of the fifth P-type transistor is connected to the output of the first static inverter; and the gates of the sixth P- and N-type transistors are connected to the third input.

7. A CMOS full-adder stage that receives a first signal to be added, a second signal to be added and a carry input signal, said full-adder stage providing a sum output signal and a carry output signal, said first signal to be added being provided as an uninverted first input signal to be added and an inverted first input signal to be added, said CMOS full-adder stage comprising:

a first subinput that receives the uninverted first input signal to be added;

an associated second subinput that receives the inverted first input signal to be added;

a second input that receives the second signal to be added;

a third input that receives the carry input signal;

a first P-type transistor having its gate connected to the first subinput, and one terminal of its source-drain path to the second input;

a first N-type transistor having its gate connected to the second subinput, and one terminal of its source-drain path to the second input;

a second N-type transistor having its gate connected to the second input, and one terminal of its source-drain path to the second subinput;

a second P-type transistor having its gate connected to the second input, and one terminal of its source-drain path to the first subinput;

a common junction point of the other terminals of the source-drain paths of the first and second P- and N-type transistors;

a first static inverter formed by the series combination of the source-drain paths of a third P-type transistor and a third N-type transistor, said series combination formed by the common connection of one terminal of the source-drain path of the third P-type transistor with one terminal of the sourcedrain path of the third N-type transistor, said common connection comprising the output of said first static inverter, said third P-type transistor and said N-type transistor having their gates connected to the common junction point, said gates being the input of said first static inverter, said series combination being interposed between a supply voltage source and ground;

a transmission gate consisting of a fourth N-type transistor and a fourth P-type transistor having their gates connected, respectively, to the output and the input of the first static inverter, the output of the transmission gate being the carry output signal, and the input of the transmission gate being presented with the inverted first signal to be added;

a series combination of the source-drain paths of a fifth P-type transistor, a sixth P-type transistor, a sixth N-type transistor, and a fifth N-type transistor, said source-drain paths being arranged in this order between the supply-voltage source and ground, said fifth P-type transistor and said fifth N-type transistor comprising a first pair of transistors symmetrical with respect to a center point of said series combination, said sixth P-type transistor and said sixth N-type transistor comprising a second pair of transistors symmetrical with respect to said center point of said series combination, wherein:

the center point of the series combination connected to the output of the transmission gate;

the gates of the two transistors in one of said first and second pairs of transistors being connected together and connected to the third input; and the gate of one of the two transistors of the other of said first and second pairs of transistors connected to the common junction point, and the gate of the other of the two transistors of the other of said first and second pairs of transistors connected to the output of the static inverter;

a seventh P-type transistor having its gate connected to the common junction point;

a seventh N-type transistor having its gate connected to the output of the first static inverter;

an eighth N-type transistor having one terminal of its source-drain path connected to the output of the first static inverter;

an eighth P-type transistor having one terminal of its source-drain path connected to the common junction point;

a node having one terminal of the source-drain path of the seventh P-type transistor, one terminal of the sourcedrain path of the seventh N-type transistor, and the gates of the eighth P- and N- type transistors connected thereto; and a common node of the other terminals of the source drain paths of the seventh and eighth P- and N-type transistors, which is the output for the sum signal; wherein:

said CMOS full-adder stage further comprises:

a second static inverter formed by the series combination of the source-drain paths of a ninth P-type transistor and a ninth N-type transistor interposed between the supply-voltage source and ground, the input of the second static inverter being connected to the third input, and the output of the second static inverter being connected to the node;

and wherein:

the input of the transmission gate is connected to the second subinput;

the gate of the fifth N-type transistor is connected to the common junction point;

the gate of the fifth P-type transistor is connected to the output of the first static inverter; and the gates of the sixth P- and N-type transistors are connected to the third input.

8. A CMOS full-adder stage that receives a first signal to be added, a second signal to be added and a carry input signal, said full-adder stage providing a sum output signal and a carry output signal, said first signal to be added being provided as an uninverted first input signal to be added and an inverted first input signal to be added, said CMOS full-adder stage comprising:

a first subinput that receives the uninverted first input signal to be added;

an associated second subinput that receives the inverted first input signal to be added;

a second input that receives the second signal to be added;

a third input that receives the carry input signal; a first P-type transistor having its gate connected to the second subinput, and one terminal of its source-drain path to the second input;

a first N-type transistor having its gate connected to the first subinput, and one terminal of its source-drain path to the second input;

a second N-type transistor having its gate connected to the second input, and one terminal of its source-drain path coupled to receive a signal responsive to the inverted first signal to be added;

a second P-type transistor having its gate connected to the second input, and one terminal of its source-drain path coupled receive a signal responsive to the uninverted first signal to be added;

a common junction point of the other terminals of the source-drain paths of the first and second P- and N-type transistors;

a first static inverter formed by the series combination of the source-drain paths of a third P-type transistor and a third N-type transistor, said series combination formed by the common connection of one terminal of the source-drain path of the third P-type transistors with one terminal of the source-drain path of the third N-type transistor, said common connection comprising the output of said first static inverter, said third P-type transistor and said N-type transistor having their gates connected to the common junction point, said gates being the input of said first static inverter, said series combination being interposed between a supply voltage source and ground;

a transmission gate consisting of a fourth N-type transistor and a fourth P-type transistor having their gates connected, respectively, to the input and the output of the first static inverter, the output of the transmission gate being the carry output signal, and the input of the transmission gate being presented with the inverted first signal to be added;

a series combination of the source-drain paths of a fifth P-type transistor, a sixth P-type transistor, a sixth N-type transistor, and a fifth N-type transistor, said source-drain paths being arranged in this order between the supply-voltage source and ground, said fifth P-type transistor and said fifth N-type transistor comprising a first pair of transistors symmetrical with respect to a center point of said series combination, said sixth P-type transistor and said sixth N-type transistor comprising a second pair of transistors symmetrical with respect to said center point of said series combination, wherein:

the center point of the series combination connected to the output of the transmission gate;

the gates of the two transistors in one of said first and second pairs of transistors being connected together and connected to the third input; and the gate of one of the two transistors of the other of said first and second pairs of transistors connected to the common junction point, and the gate of the other of the two transistors of the other of said first and second pairs of transistors connected to the output of the static inverter;

a seventh P-type transistor having its gate connected to the common junction point;

a seventh N-type transistor having its gate connected to the output of the first static inverter;

an eighth N-type transistor having one terminal of its source-drain path connected to the output of the first static inverter;

an eighth P-type transistor having one terminal of its source-drain path connected to the common junction point;

a node having one terminal of the source-drain path of the seventh P-type transistor, one terminal of the source-drain path of the seventh N-type transistor, and the gates of the eighth P- and N- type transistors connected thereto; and a common node of the other terminals of the source-drain paths of the seventh and eighth P- and N-type transistors, which is the output for the sum signal; wherein:

said CMOS full-adder stage further comprises:

a second static inverter formed by the series combination of the source-drain paths of a ninth P-type transistor and a ninth N-type transistor interposed between the supply-voltage source and ground, the input of the second static inverter being connected to the third input, and the output of the second static inverter being connected to the node;

a tenth N-type transistor having its source-drain path interposed between said one terminal of the source-drain path of said second N-type transistor and ground, the gate of said tenth N-type transistor being connected to the second subinput; and a tenth P-type transistor having its source-drain path interposed between said one terminal of the source-drain path of said second P-type transistor and the supply-voltage source, the gate of said tenth P-type transistor being connected to the first subinput;

and wherein:

the input of the transmission gate is connected to the second subinput;

the gate of the fifth P-type transistor is connected to the common junction point;

the gate of the fifth N-type transistor is connected to the output of the first static inverter; and the gates of the sixth P- and N-type transistors are connected to the third input.

9. A CMOS full-adder stage that receives a first signal to be added, a second signal to be added and a carry input signal, said full-adder stage providing a sum output signal and a carry output signal, said first signal to be added being provided as an uninverted first input signal to be added and an inverted first input signal to be added, said CMOS full-adder stage comprising:

a first subinput that receives the uninverted first input signal to be added;

an associated second subinput that receives the inverted first input signal to be added;

a second input that receives the second signal to be added;

a third input that receives the carry input signal;

a first P-type transistor having its gate connected to the first subinput, and one terminal of its source-drain path to the second input;

a first N-type transistor having its gate connected to the second subinput, and one terminal of its source-drain path to the second input;

a second N-type transistor having its gate connected to the second input, and one terminal of its source-drain path coupled to receive a signal responsive to the uninverted first signal to be added;

a second P-type transistor having its gate connected to the second input, and one terminal of its source-drain path coupled receive a signal responsive to the inverted first signal to be added;

a common junction point of the other terminals of the source-drain paths of the first and second P- and N-type transistors;

a first static inverter formed by the series combination of the source-drain paths of a third P-type transistor and a third N-type transistor, said series combination formed by the common connection of one terminal of the source-drain path of the third P-type transistor with one terminal of the source-drain path of the third N-type transistor, said common connection comprising the output of said first static inverter, said third P-type transistor and said N-type transistor having their gates connected to the common junction point, said gates being the input of said first static inverter, said series combination being interposed between a supply voltage source and ground;

a transmission gate consisting of a fourth N-type transistor and a fourth P-type transistor having their gates connected, respectively, to the output and the input of the first static inverter, the output of the transmission gate being the carry output signal, and the input of the transmission gate being presented with the uninverted first signal to be added;

a series combination of the source-drain paths of a fifth P-type transistor, a sixth P-type transistor, a sixth N-type transistor, and a fifth N-type transistor, said source-drain paths being arranged in this order between the supply-voltage source and ground, said fifth P-type transistor and said fifth N-type transistor comprising a first pair of transistors symmetrical with respect to a center point of said series combination, said sixth P-type transistor and said sixth N-type transistor comprising a second pair of transistors symmetrical with respect to said center point of said series combination, wherein:

the center point of the series combination connected to the output of the transmission gate;

the gates of the two transistors in one of said first and second pairs of transistors being connected together and connected to the third input; and the gate of one of the two transistors of the other of said first and second pairs of transistors connected to the common junction point, and the gate of the other of the two transistors of the other of said first and second pairs of transistors connected to the output of the static inverter;

a seventh P-type transistor having its gate connected to the common junction point;

a seventh N-type transistor having its gate connected to the output of the first static inverter;

an eighth N-type transistor having one terminal of its source-drain path connected to the output of the first static inverter;

an eighth P-type transistor having one terminal of its source-drain path connected to the common junction point;

a node having one terminal of the source-drain path of the seventh P-type transistor, one terminal of the source-drain path of the seventh N-type transistor, and the gates of the eighth P- and N- type transistors connected thereto; and a common node of the other terminals of the source-drain paths of the seventh and eighth P- and N-type transistors, which is the output for the sum signal; wherein:

said CMOS full-adder stage further comprises:

a second static inverter formed by the series combination of the source-drain paths of a ninth P-type transistor and a ninth N-type transistor interposed between the supply-voltage source and ground, the input of the second static inverter being connected to the third input, and the output of the second static inverter being connected to the node;

a tenth N-type transistor having its source-drain path interposed between said one terminal of the source-drain path of said second N-type transistor and ground, the gate of said tenth N-type transistor being connected to the first subinput; and a tenth P-type transistor having its source-drain path interposed between said one terminal of the source-drain path of said second P-type transistor and the supply-voltage source, the gate of said tenth P-type transistor being connected to the second subinput;

and wherein:

the input of the transmission gate is connected to the first subinput;

the gate of the fifth N-type transistor is connected to the common junction point;

the gate of the fifth P-type transistor is connected to the output of the first static inverter; and the gates of the sixth P- and N-type transistors are connected to the third input.

* * * * *